United States Patent
Rihn et al.

(10) Patent No.: US 9,715,279 B2
(45) Date of Patent: Jul. 25, 2017

(54) HAPTIC DEVICES AND METHODS FOR PROVIDING HAPTIC EFFECTS VIA AUDIO TRACKS

(71) Applicant: Immersion Corporation, San Jose, CA (US)

(72) Inventors: William Rihn, San Jose, CA (US); Henry da Costa, Montreal (CA)

(73) Assignee: Immersion Corporation, San Jose, CA (US)

( * ) Notice: Subject to any disclaimer, the term of this patent is extended or adjusted under 35 U.S.C. 154(b) by 66 days.

(21) Appl. No.: 14/727,465

(22) Filed: Jun. 1, 2015

(65) Prior Publication Data

US 2015/0355712 A1   Dec. 10, 2015

Related U.S. Application Data

(60) Provisional application No. 62/009,898, filed on Jun. 9, 2014.

(51) Int. Cl.
*G08B 6/00* (2006.01)
*G06F 3/01* (2006.01)
(Continued)

(52) U.S. Cl.
CPC ............ *G06F 3/016* (2013.01); *A63F 13/285* (2014.09); *G06F 3/165* (2013.01); *G06F 2203/013* (2013.01); *G06F 2203/015* (2013.01)

(58) Field of Classification Search
None
See application file for complete search history.

(56) References Cited

U.S. PATENT DOCUMENTS

| 8,508,486 B2 | 8/2013 | Grant et al. |
| 8,698,759 B2 | 4/2014 | Shin |

(Continued)

FOREIGN PATENT DOCUMENTS

| EP | 0 875 819 A1 | 11/1998 |
| EP | 2 648 071 A1 | 10/2013 |

(Continued)

OTHER PUBLICATIONS

"Extended European Search Report", Application No. 15 17 1161.1, Oct. 20, 2015.

(Continued)

*Primary Examiner* — George Bugg
*Assistant Examiner* — Renee Dorsey
(74) *Attorney, Agent, or Firm* — Medler Ferro Woodhouse & Mills PLLC

(57) ABSTRACT

Embodiments hereof relate a system that includes a processor and a haptic peripheral with a haptic output device. The processor is configured to receive an audio file, or a haptic file generated from the audio file, that includes a first channel having a first set of control parameters to generate a first haptic effect and a second channel having a second set of control parameters to generate a second haptic effect and to output a control signal that includes the first and second sets of control parameters for the haptic effect. The haptic output device is configured to receive the control signal from the processor and to output the haptic effect to the haptic peripheral. In an embodiment, the haptic output device is coupled to a bi-directional trigger and the control parameters move the trigger in opposing directions. In another embodiment, the control parameters generate different timelines of haptic effects to a user input element.

20 Claims, 12 Drawing Sheets

(51) Int. Cl.
*G06F 3/16* (2006.01)
*A63F 13/285* (2014.01)

(56) References Cited

U.S. PATENT DOCUMENTS

| | | | | |
|---|---|---|---|---|
| 8,754,757 B1* | 6/2014 | Ullrich | ................... | G06F 3/016 |
| | | | | 340/407.1 |
| 2009/0289779 A1 | 11/2009 | Braun et al. | | |
| 2010/0302015 A1 | 12/2010 | Kipman et al. | | |
| 2011/0216060 A1 | 9/2011 | Weising et al. | | |
| 2011/0248837 A1 | 10/2011 | Israr et al. | | |
| 2012/0038582 A1 | 2/2012 | Grant | | |
| 2012/0062491 A1* | 3/2012 | Coni | ................... | G06F 3/016 |
| | | | | 345/173 |
| 2012/0269332 A1* | 10/2012 | Mukund | ................ | H04S 3/006 |
| | | | | 379/201.06 |
| 2013/0131851 A1* | 5/2013 | Ullrich | ..................... | G06F 3/16 |
| | | | | 700/94 |
| 2013/0194085 A1* | 8/2013 | Grant | ..................... | G06F 3/016 |
| | | | | 340/407.2 |
| 2013/0202134 A1* | 8/2013 | Afshar | ..................... | H04R 1/22 |
| | | | | 381/151 |
| 2013/0227410 A1* | 8/2013 | Sridhara | ............. | H04N 21/235 |
| | | | | 715/702 |
| 2013/0265286 A1* | 10/2013 | Da Costa | ................ | G06F 3/016 |
| | | | | 345/177 |
| 2014/0056461 A1* | 2/2014 | Afshar | ..................... | H04R 1/00 |
| | | | | 381/385 |
| 2014/0176415 A1* | 6/2014 | Buuck | ..................... | G06F 3/016 |
| | | | | 345/156 |
| 2015/0077324 A1* | 3/2015 | Birnbaum | ............... | G06F 3/016 |
| | | | | 345/156 |
| 2015/0091947 A1 | 4/2015 | Rakow et al. | | |
| 2015/0326972 A1* | 11/2015 | Barton | ..................... | H04R 3/04 |
| | | | | 381/98 |
| 2015/0350803 A1* | 12/2015 | Wyatt | ..................... | H04R 3/12 |
| | | | | 381/17 |

FOREIGN PATENT DOCUMENTS

| | | |
|---|---|---|
| EP | 2 873 447 A1 | 5/2015 |
| WO | 2011/011552 A1 | 1/2011 |

OTHER PUBLICATIONS

First Examination Report, EP Application No. 15 171 161.1, Nov. 8, 2016.

* cited by examiner

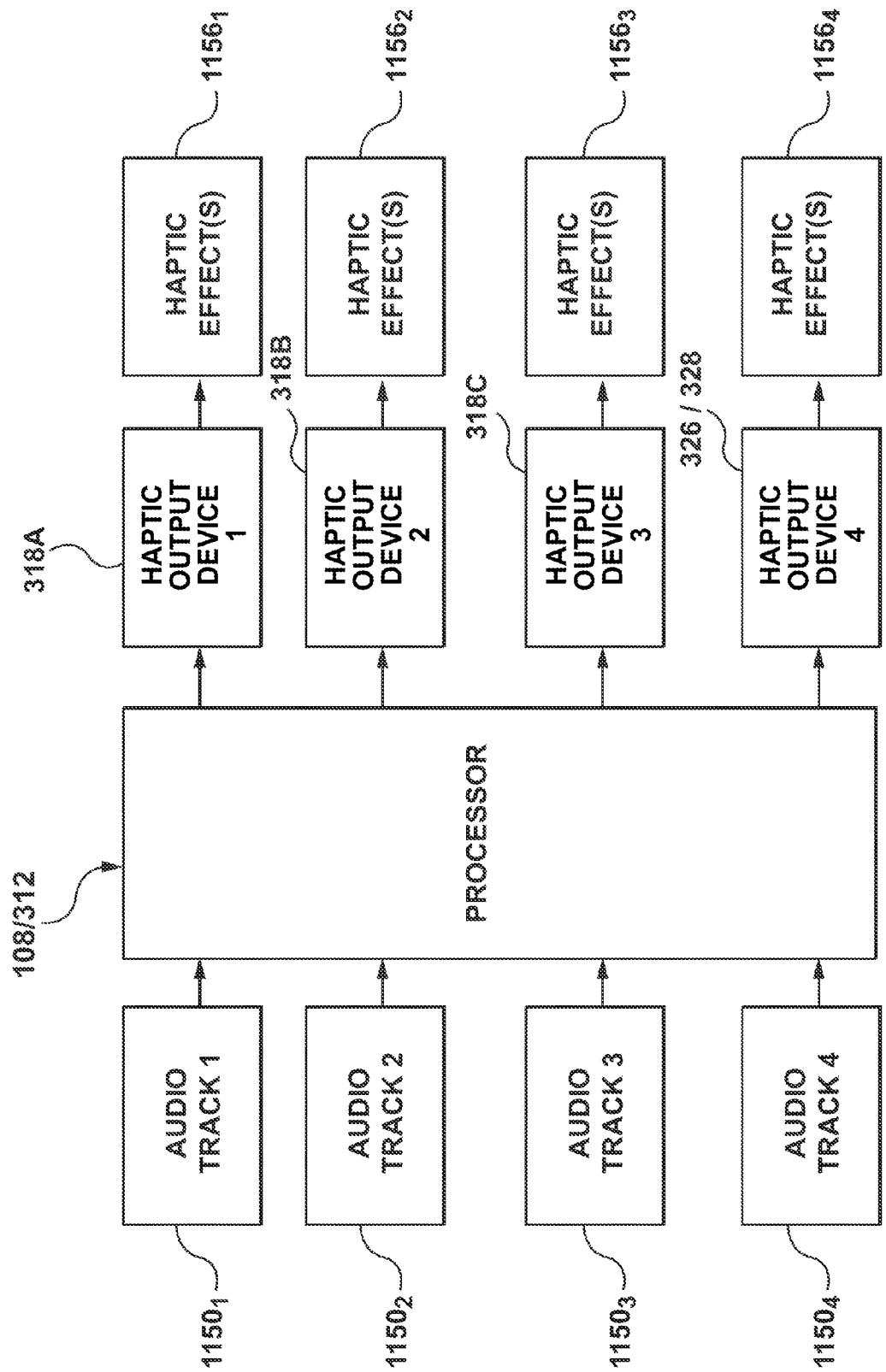

HAPTIC DEVICES AND METHODS FOR PROVIDING HAPTIC EFFECTS VIA AUDIO TRACKS

CROSS-REFERENCE TO RELATED APPLICATIONS

This application claims the benefit of U.S. Provisional Patent Application Ser. No. 62/009,898, filed Jun. 9, 2014, which is hereby incorporated by reference in its entirety for all purposes.

FIELD OF THE INVENTION

Embodiments hereof relate to systems and methods for providing haptic effects or feedback.

BACKGROUND OF THE INVENTION

Video games and virtual reality systems have become even more popular due to the marketing toward, and resulting participation from, casual gamers. In a typical implementation, a computer system displays a visual or graphical environment to a user on a display device. Users can interact with the displayed environment by inputting commands or data from the interface device. The computer updates the environment in response to the user's manipulation of a moved manipulandum such as a joystick handle and provides visual feedback to the user using the display screen.

Conventional video game devices or controllers use visual and auditory cues to provide feedback to a user. In some interface devices, kinesthetic feedback (such as active and resistive haptic feedback) and/or tactile feedback (such as vibration, texture, and heat) is also provided to the user, more generally known collectively as "haptic feedback" or "haptic effects." Haptic feedback can provide cues that enhance and simplify the user interface. For example, vibration effects, or vibrotactile haptic effects, may be useful in providing cues to users of electronic devices to alert the user to specific events, or provide realistic feedback to create greater sensory immersion within a simulated or virtual environment. Conventional haptic feedback systems for gaming and other devices generally include an actuator or haptic output device for generating the haptic feedback attached to the housing of the controller/peripheral. More particularly, motors or other actuators of the interface device are housed within the controller and are connected to the controlling computer system. The computer system receives sensor signals from the interface device and sends appropriate haptic feedback control signals to the actuators. The actuators then provide haptic feedback to the controller. The computer system can thus convey physical sensations to the user in conjunction with other visual and auditory feedback.

There is a need for haptic feedback systems that provide variation of haptic effects not previously available to provide a more immersive and enjoyable experience for the user.

BRIEF SUMMARY OF THE INVENTION

Embodiments hereof relate to a system that includes a processor and a haptic peripheral with a haptic output device. The processor is configured to receive a file including control parameters for a haptic effect and to output a control signal that includes the control parameters for the haptic effect. The file is an audio file or a haptic file generated from the audio file. The haptic output device is configured to receive the control signal from the processor and to output the haptic effect to the haptic peripheral.

Embodiments hereof also relate to a system that includes a processor and a haptic peripheral with a haptic output device. The processor is configured to receive a file that includes a first channel having a first set of control parameters to generate a first haptic effect and a second channel having a second set of control parameters to generate a second haptic effect and to output a control signal that includes the first and second sets of control parameters for the haptic effect. The file is an audio file or a haptic file generated from the audio file. The haptic output device is configured to receive the control signal from the processor and to output the haptic effect to the haptic peripheral.

Embodiments hereof also relate to a method of providing haptic effects to a haptic peripheral. The method includes the steps of generating an audio file and sending the audio file to a processor. The audio file includes a first channel having a first set of control parameters to generate a first haptic effect and a second channel having a second set of control parameters to generate a second haptic effect. The processor is configured to receive the audio file and to output a control signal that includes the first and second sets of control parameters for the haptic effect, the control signal being configured to be received by a haptic output device of the haptic peripheral that is configured to output the haptic effect to the haptic peripheral.

BRIEF DESCRIPTION OF DRAWINGS

The foregoing and other features and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIG. 11 illustrates a block diagram of a system for providing haptic effects to multiple haptic output devices of a haptic peripheral according to an embodiment hereof, wherein each audio file includes at least one channel having a set of control parameters to generate a haptic effect for each respective haptic output device.

DETAILED DESCRIPTION OF THE INVENTION

Specific embodiments of the present invention are now described with reference to the figures, wherein like reference numbers indicate identical or functionally similar elements. The following detailed description is merely exemplary in nature and is not intended to limit the invention or the application and uses of the invention. Furthermore, there is no intention to be bound by any expressed or implied theory presented in the preceding technical field, background, brief summary or the following detailed description. Furthermore, although the following description is primarily directed to gaming devices and controllers for gaming devices, those skilled in the art would recognize that the description applies equally to other virtual reality systems and peripherals for the virtual reality systems.

Embodiments hereof relate to a system that includes a processor and a haptic peripheral with a haptic output device. According to embodiments hereof, which will be described in more detail herein with respect to the figures, an audio track or file including control parameters for a haptic effect is generated. The processor is configured to receive the audio file, or a haptic file generated from the audio file, and to output a control signal that includes the control parameters for the haptic effect. The haptic output device is configured to receive the control signal from the processor and to output the haptic effect to the haptic peripheral.

Figure 1:
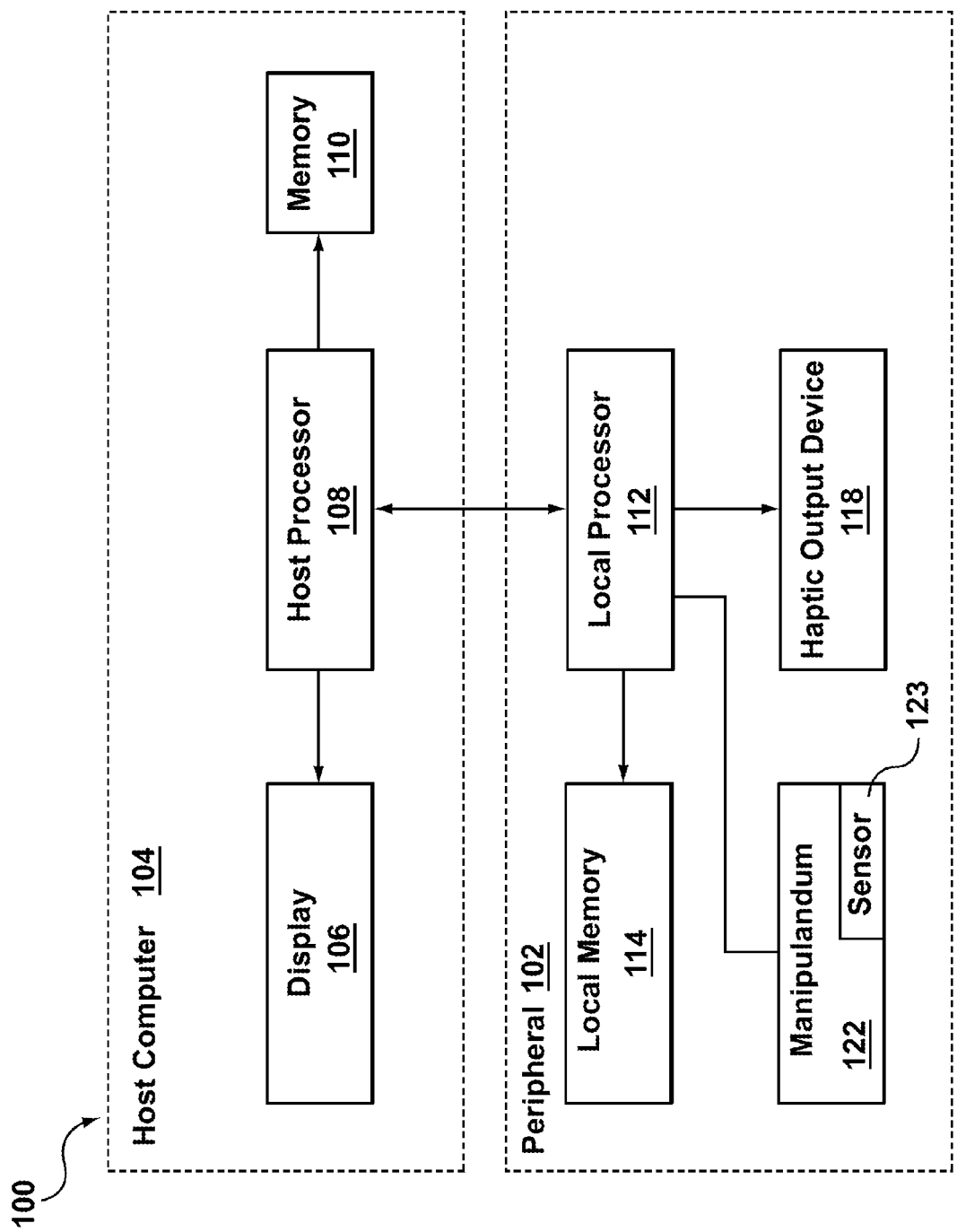
FIG. 1 is a block diagram of a system for providing haptic feedback to a haptic peripheral according to an embodiment hereof.
Figure 2:
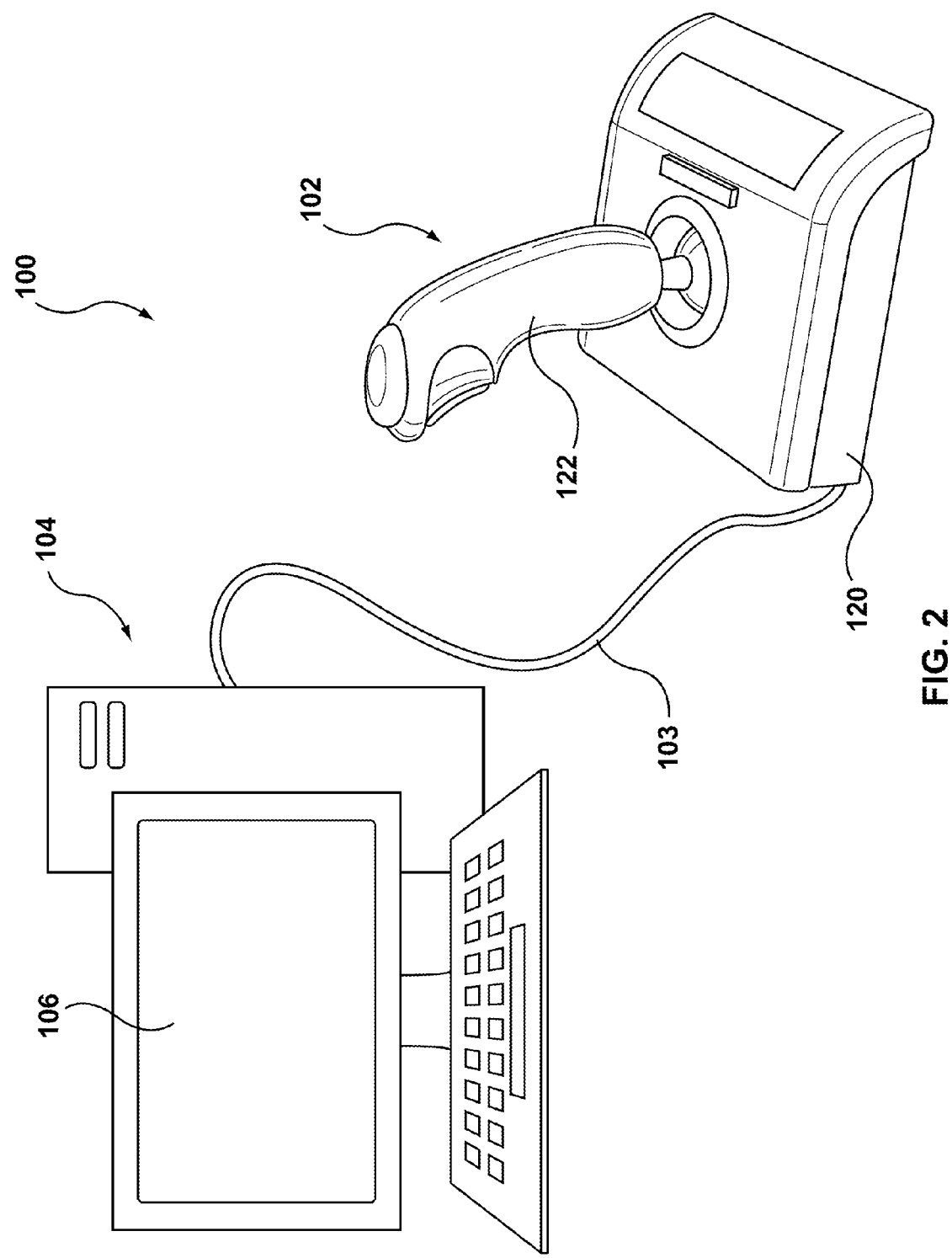
FIG. 2 is a schematic illustration of the system of FIG. 1, wherein the haptic peripheral is a haptic joystick.
Figure 4:
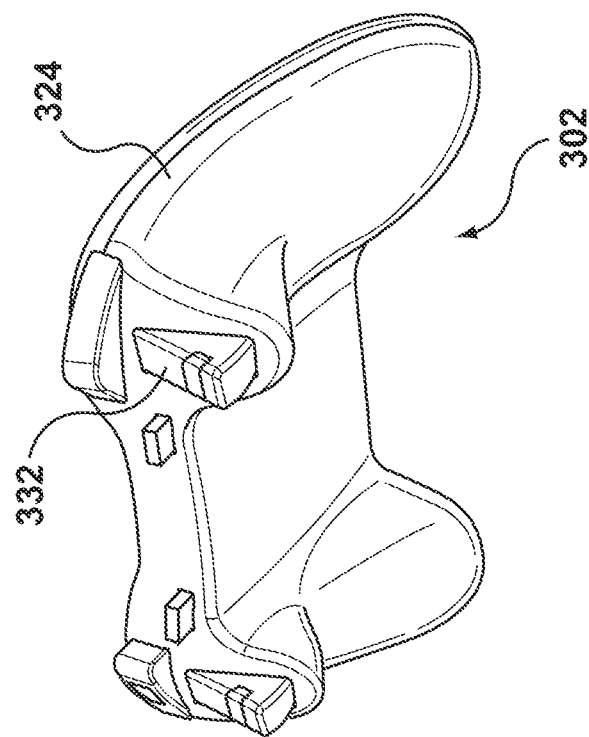
FIGS. 3 and 4 are perspective views of a haptic peripheral according to an embodiment hereof, wherein the haptic peripheral is a handheld gaming controller.
Figure 3:
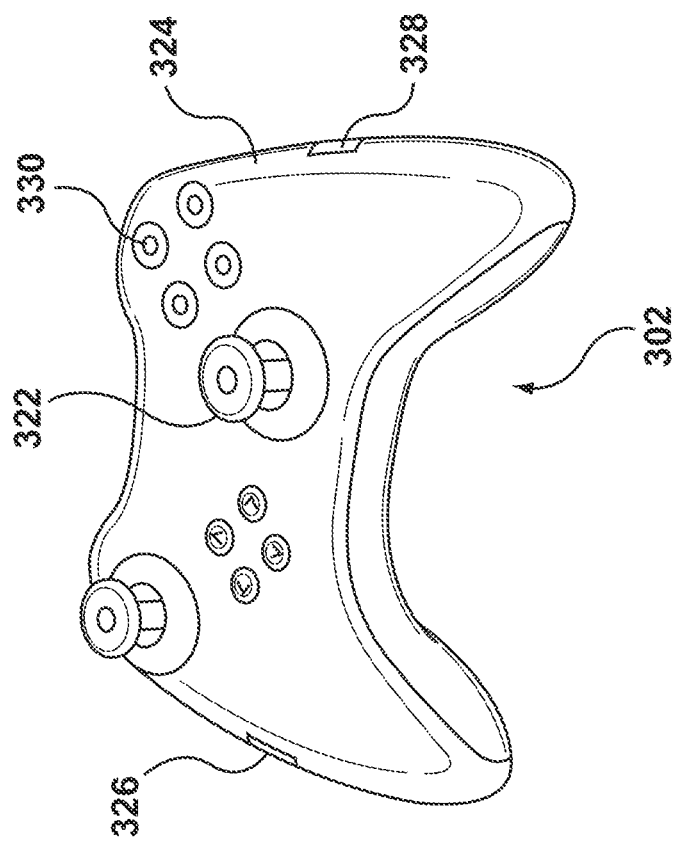
Figure 5:
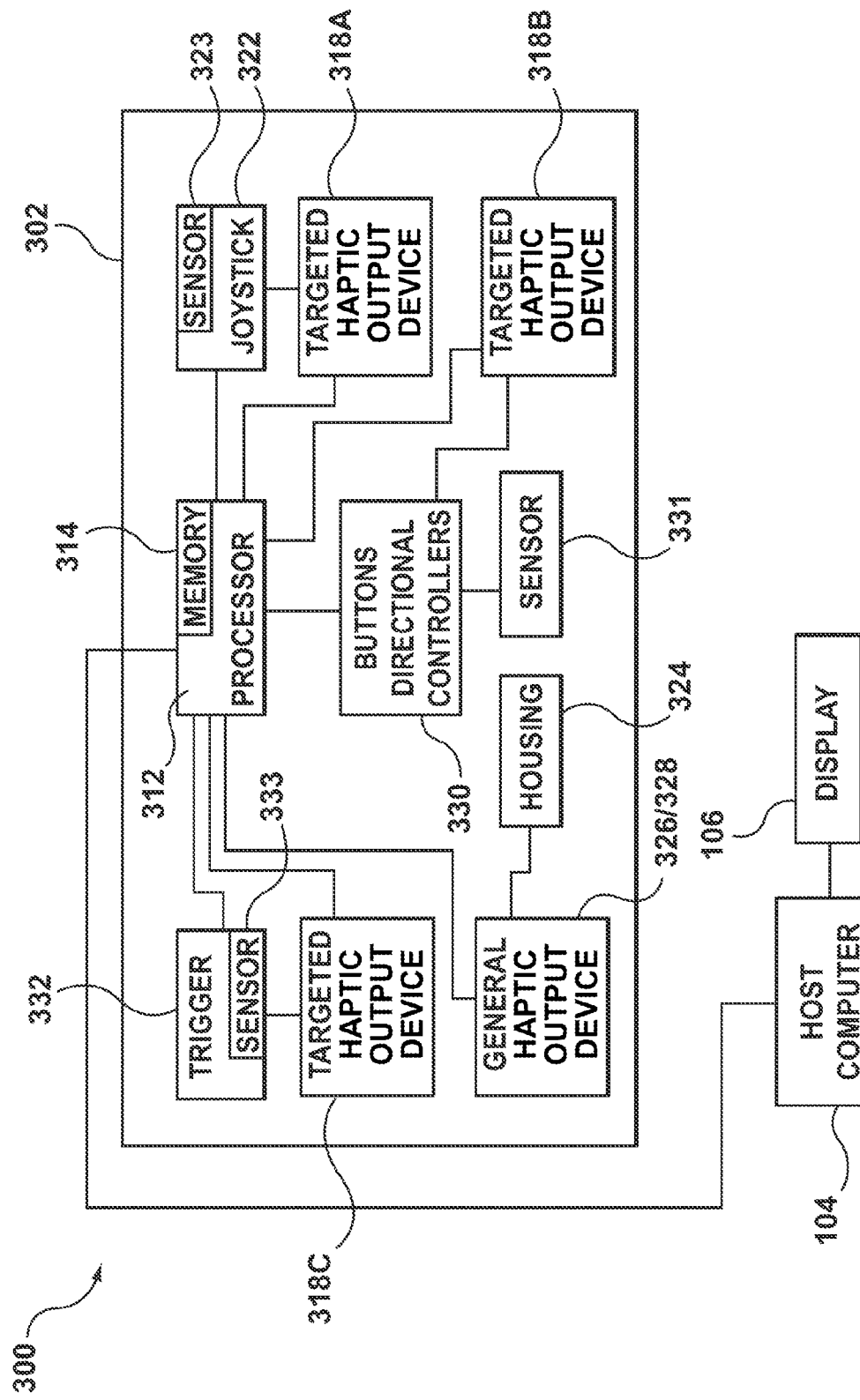
FIG. 5 illustrates a block diagram of the gaming controller of FIGS. 3 and 4.
Figure 6:
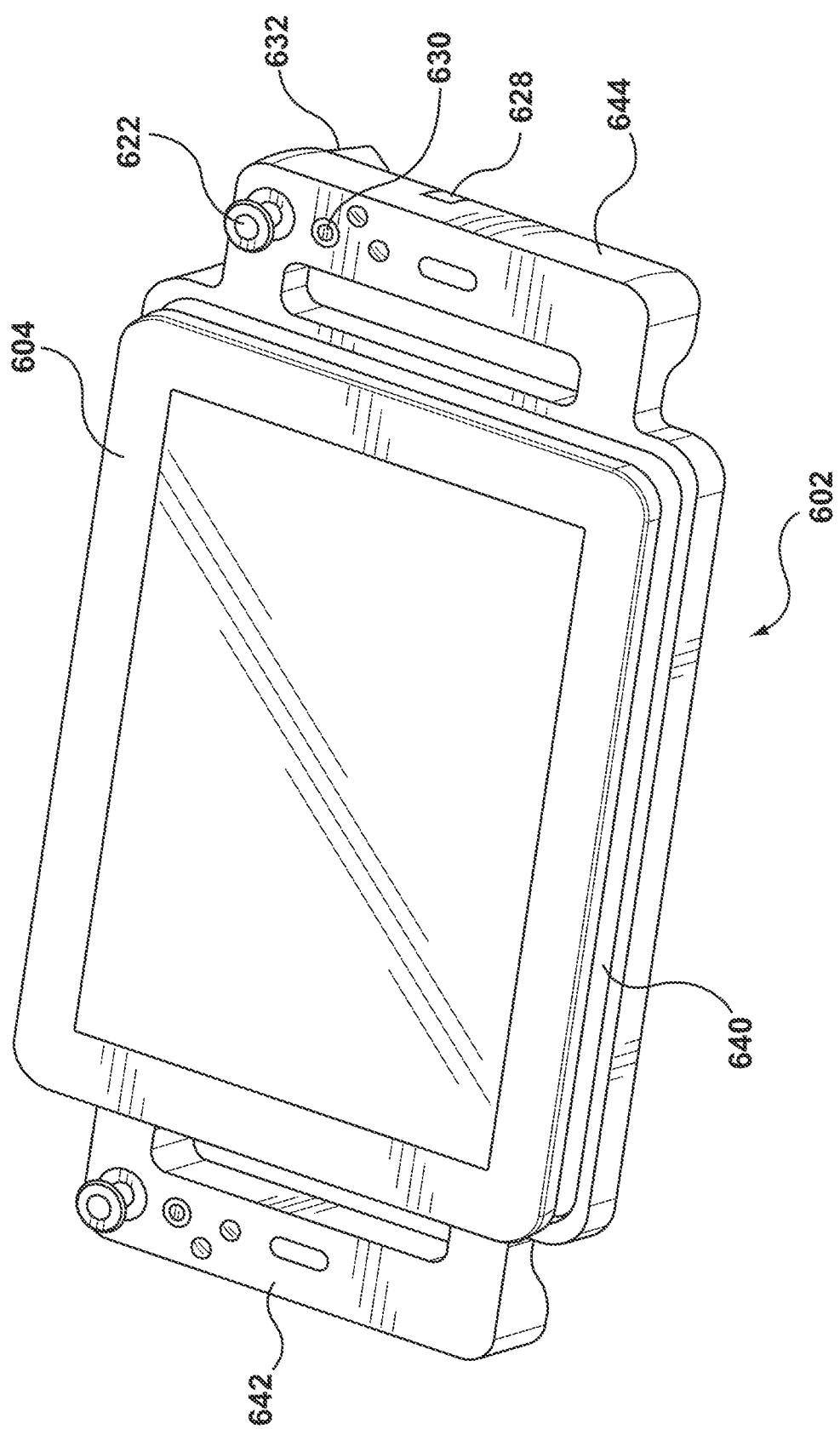
FIG. 6 is a perspective view of a system for providing haptic feedback to a haptic peripheral according to an embodiment hereof, wherein the haptic peripheral is a gaming tablet controller that may be used with a tablet computer.
Figure 7:
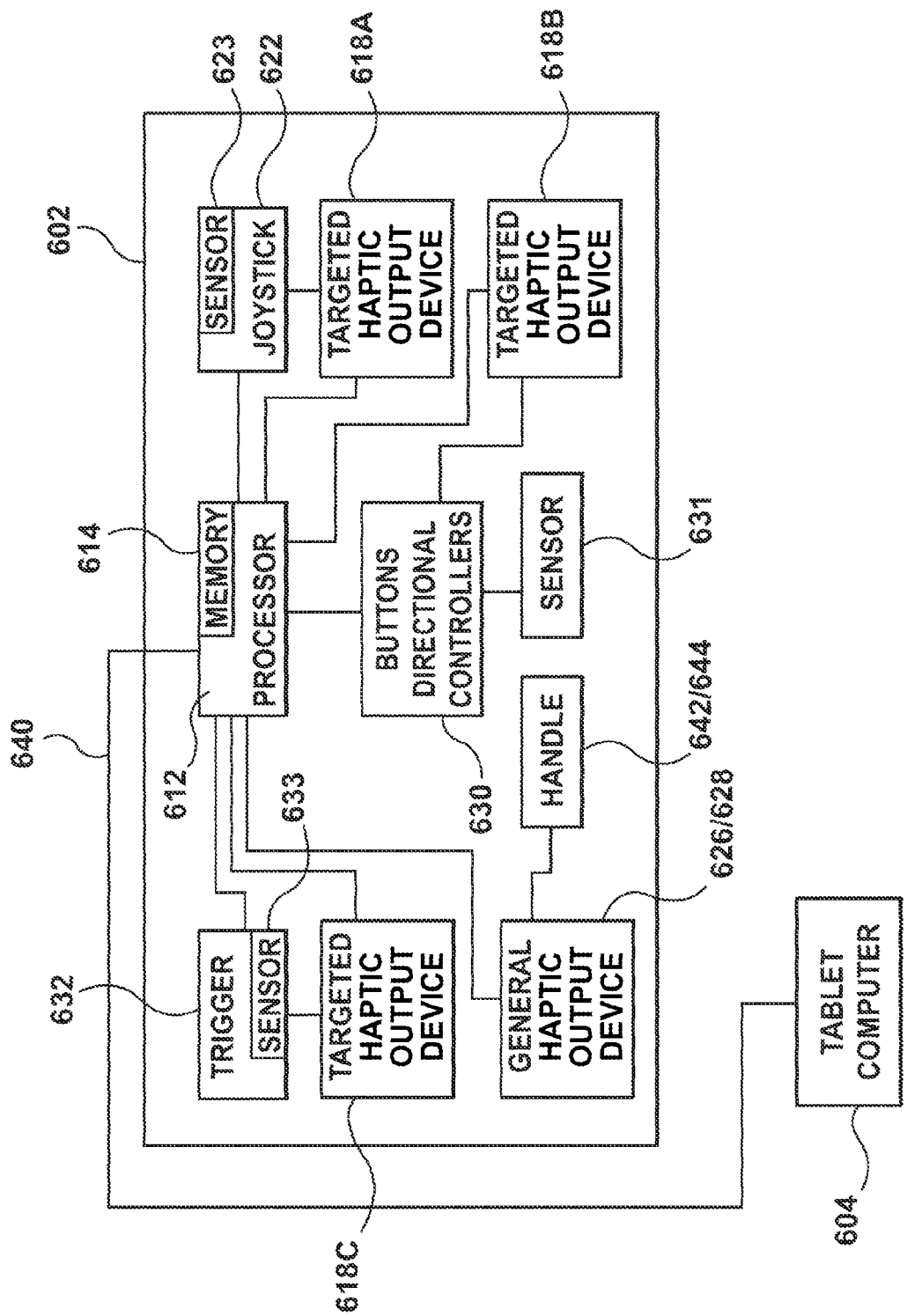
FIG. 7 illustrates a block diagram of the system of FIG. 6.

An audio file including control parameters for a haptic effect may be utilized in various types of haptic peripherals, such as those shown in FIGS. 1-7. More particularly, FIG. 1 is a block diagram of a system 100 for providing haptic feedback to a haptic peripheral 102 according to an embodiment hereof and FIG. 2 is a schematic illustration of the system of FIG. 1. In the embodiment of FIGS. 1-2, haptic peripheral 102 is a haptic joystick with only a single manipulandum 122. However, those skilled in the art would recognize that the haptic joystick is merely an exemplary embodiment of a haptic peripheral and that haptic peripherals with other configurations, shapes, and sizes may be used. For example, as will be described in more detail herein, the haptic peripheral may be a handheld gaming controller 302 for a gaming system as shown in FIGS. 3-5 which is of similar shape and size to many "gamepads" currently available for video game console systems, a haptic peripheral 602 that may be used with a tablet computer 604 as shown in FIGS. 6-7, or other controllers that having user input (UI) elements such as, but not limited to, touch screen(s) and touch surface(s), phones, personal digital assistants (PDA), tablets, computers, gaming peripherals, and other controllers for virtual reality systems known to those skilled in the art.

With reference to the embodiment of FIGS. 1-2, haptic peripheral 102 is in communication with a host computer or computer system 104 that is configured to generate a virtual environment to a user on a display 106. Host computer 104 may include a video game console, mobile device, or any other type of computer system that contains a processor configured to generate a virtual environment to a user on a display. As shown in the block diagram of FIG. 2, host computer 104 includes a host processor 108, a memory 110, and display 106. Host computer 104 executes a software application that is stored in memory 110 and is executed by host processor 108. Host processor 108 may be any type of general purpose processor, or could be a processor specifically designed to provide haptic effect signals. Host processor 108 may be the same processor that operates the entire host computer 104, or may be a separate processor. Host processor 108 can decide what haptic effects to send to haptic peripheral 102 and in what order to send the haptic effects. Memory 110 may be any type of storage device or computer-readable medium, such as but not limited to random access memory (RAM) or read-only memory (ROM). Memory 110 may also be located internal to the host processor, or any combination of internal and external memory.

Host computer 104 is coupled to display 106 via wired or wireless means. Display 106 may be any type of medium that provides graphical information to a user; this includes but is not limited to monitors, television screens, plasmas, LCDs, projectors, or any other display devices. In an embodiment, host computer 104 is a gaming device console and display 106 is a monitor which is coupled to the gaming device console, as known in the art. In another embodiment, as known to those skilled in the art, host computer 104 and display 106 may be combined into a single device.

In the embodiment shown in FIGS. 1-2, host computer 104 is in communication with haptic peripheral 102 through a wired or USB connection 103. However, in other embodiments, haptic peripheral 102 may communicate with host computer 104 using other wired communication or wireless communication means known to those of skill in the art. This can include but is not limited to a serial or Bluetooth connection.

As best shown in FIG. 2, haptic peripheral 102 includes a housing or base 120 and manipulandum or user input device 122 which can move in one or more degrees of freedom. Manipulandum 122 extends from housing 120. Although FIG. 2 illustrates a joystick as the manipulandum of the haptic peripheral, it will be understood by one of ordinary skill in the art that the present disclosure is not limited to a joystick manipulandum, but also includes any devices moveable in, either in whole or in part, one or more degrees of freedom. Those skilled in the art would recognize that the joystick is merely an exemplary embodiment of a manipulandum of a controller, and that manipulandums with other configurations such as triggers, buttons, or other user input elements may be used as will be described in more detail herein.

With additional reference to FIG. 1, haptic peripheral 102 includes a local processor 112, a local memory 114, a manipulandum sensor 123, and at least one actuator or haptic output device 118. Haptic peripheral 102 may be alternatively configured to not include local processor 112, whereby all input/output signals from haptic peripheral 102 are handled and processed directly by host computer 104. As will be explained in more detail herein, local processor 112 is coupled to haptic output device 118 to provide haptic effects thereto based on high level supervisory or streaming commands from host computer 104. Similar to host processor 108, local processor 112 also can decide what haptic effects to send and what order to send the haptic effects. In addition, if haptic peripheral 102 includes more than one haptic output device, local processor 112 can decide which haptic output device will receive the haptic effect signal. In addition, similar to memory 110 of host computer 104, local memory 114 that can be any type of storage device or computer-readable medium, such as but not limited to random access memory (RAM) or read-only memory (ROM). Local memory 114 may also be located internal to the local processor, or any combination of internal and external memory.

As stated above, manipulandum 122 of haptic peripheral 102 may be physically moved within one or more degrees of freedom. For example, a user may move the manipulandum 122 forward, backwards, left or right. When a user moves manipulandum 122, manipulandum sensor 123 detects the movement and/or position of the manipulandum and transmits a sensor signal to local processor 112. Local processor 112 then communicates or transmits the sensor signal to host computer 104. Based on the received sensor signal, host computer 104 performs actions within the video game and updates the virtual environment. Stated another way, the movement of manipulandum 122 of haptic peripheral 102 represents inputs from the user which allows the user to interact with the software applications running on host computer 104, including but not limited to video games relating to first person shooter, third person character interaction, vehicle related games, or computer simulations. The movement of manipulandum 122 may provide host computer 104 with input corresponding to the movement of a computer generated graphical object, such as a cursor or other image, or some other graphical object displayed by the host computer 104 via display 106, or to control a virtual character or gaming avatar, such as a person, vehicle, or some other entity that may be found in a game or computer simulation.

In addition to receiving sensor signals from manipulandum sensor 123, local processor 112 also receives high level supervisory or streaming commands from host computer 104 relating to haptic effects to be output from haptic output device 118. Local processor 112 then provides control or drive signals to haptic output device 118 based on the high level supervisory or streaming commands from host computer 104. For example, when in operation, voltage magnitudes and durations are streamed from host computer 104 to haptic peripheral 102 where information is provided to haptic output device 118 via local processor 112. Host computer 104 may provide high level commands to local processor 112 such as the type of haptic effect to be output (e.g. vibration, jolt, detent, pop, etc.) by haptic output device 118, whereby the local processor 112 instructs haptic output device 118 as to particular characteristics of the haptic effect which is to be output (e.g. magnitude, frequency, duration, etc.). Local processor 112 may retrieve the type, magnitude, frequency, duration, or other characteristics of the haptic effect from local memory 114 coupled thereto. Depending on game actions and control signals received from host computer 104, local processor 112 may send a control or drive signal to haptic output device 118 to output one of a wide variety of haptic effects or sensations, including vibrations, detents, textures, jolts or pops.

Haptic output device 118 may be an inertial or kinesthetic actuator as known to those of ordinary skill in the art of virtual reality systems. Possible haptic output devices include but are not limited to eccentric rotating mass ("ERM") actuators in which an eccentric mass is moved by a motor, linear resonant actuators ("LRAs") in which a mass attached to a spring is driven back and forth, piezoelectric actuators, electromagnetic motors in which an eccentric mass is moved by a motor, vibrotactile actuators, inertial actuators, shape memory alloys, electro-active polymers that deform in response to signals, mechanisms for changing stiffness, electrostatic friction (ESF), ultrasonic surface friction (USF), or other suitable types of actuating devices. Possible haptic output devices also include a combination of multiple types of actuators previously listed. In another embodiment, the haptic output device may use kinesthetic haptic feedback including, for example, solenoids to change the stiffness/damping of manipulandum 122 and/or housing 120, small air bags that change size in manipulandum 122 and/or housing 120, or shape changing materials.

As previously stated, haptic peripheral 102 is merely an exemplary embodiment of a haptic peripheral and that haptic peripherals with other configurations, shapes, and sizes may be used. For example, FIGS. 3-5 illustrate another embodiment of a haptic peripheral 302 that may be utilized in embodiments hereof. FIGS. 3 and 4 are different perspective views of haptic peripheral 302, wherein the haptic peripheral is a handheld gaming controller, while FIG. 5 illustrates a block diagram of haptic peripheral 302 used in a gaming system 300 that further includes a host computer 104 and a display 106. A housing 324 of haptic peripheral 302 is shaped to easily accommodate two hands gripping the device, either by a left-handed user or a right-handed user. Those skilled in the art would recognize that haptic peripheral 302 is merely an exemplary embodiment of a controller of similar shape and size to many "gamepads" currently available for video game console systems, and that controllers with other configurations of user input elements, shapes, and sizes may be used, including but not limited to controllers such as a Wii™ remote or Wii™ U Controller, Sony® SixAxis™ controller or Sony® Wand controller, an Xbox™ controller or similar controller, as well as controllers shaped as real life objects (such as tennis rackets, golf clubs, baseball bats, and the like) and other shapes.

Haptic peripheral 302 includes several user input elements or manipulandums, including a joystick 322, a button 330, and a trigger 332. As used herein, user input element refers to an interface device such as a trigger, button, joystick, or the like, which is manipulated by the user to interact with host computer 104. As can be seen in FIGS. 3-4 and known to those skilled in the art, more than one of each user input element and additional user input elements may be included on haptic peripheral 302. Accordingly, the present description of a trigger 332, for example, does not limit haptic peripheral 302 to a single trigger. Further, the block diagram of FIG. 5 shows only one (1) of each of joystick 322, button 330, and trigger 332. However, those skilled in the art would understand that multiple joysticks, buttons, and triggers, as well as other user input elements, may be used, as described above.

As can be seen in the block diagram of FIG. 5, haptic peripheral 302 includes a targeted actuator or haptic output device to directly drive each of the user input elements thereof as well as one or more general or rumble haptic output devices 326, 328 coupled to housing 324 in a location where a hand of the user is generally located. More particularly, joystick 322 includes a targeted actuator or haptic output device 318A coupled thereto, button 330 includes a targeted actuator or haptic output device 318B coupled thereto, and trigger 332 includes a targeted actuator or haptic output device 318C coupled thereto. In addition to a plurality of targeted haptic output devices, haptic peripheral 302 includes a position sensor coupled to each of the user input elements thereof. More particularly, joystick 322 includes a position sensor 323 coupled thereto, button 330 includes a position sensor 331 coupled thereto, and trigger 332 includes a position sensor 333 coupled thereto. Local processor 312 is coupled to targeted haptic output devices 318A, 318B, 318C as well as position sensors 323, 331, 333 of joystick 322, button 330, and trigger 332, respectively. In response to signals received from position sensors 323, 331, 333, local processor 312 instructs targeted haptic output devices 318A, 318B, 318C to provide directed or targeted effects directly to joystick 322, button 330, and trigger 332, respectively. Such targeted effects are discernible or distinguishable from general or rumble haptic effects produced by general haptic output devices 326, 328 along the entire body of the controller. The collective haptic effects provide the user with a greater sense of immersion to the game as multiple modalities are being simultaneously engaged, e.g., video, audio, and haptics. Similar to haptic peripheral 102 and host computer 104, haptic peripheral 302 is coupled to and communicates with host computer 104 having a display 106. Local processor 312 of haptic peripheral 302 is coupled to each haptic output device to provide haptic effects thereto based on high level supervisory or streaming commands from host computer 104. The haptic output devices of haptic peripheral 302 may be any type of actuator listed herein for haptic output device 118 of haptic peripheral 102.

FIGS. 6-7 illustrate a haptic peripheral 602 according to another embodiment hereof in which haptic peripheral 602 is a gaming tablet controller that may be used with a tablet computer 604. Tablet computer 604 may be designed specifically for gaming activities, such as is available from Razer Inc., or may be a tablet computer well known and available in the market, such as an Apple® Ipad®, Kindle® Fire®, and Samsung® Galaxy Tab®. Haptic peripheral 602 includes a docking portion 640 configured to receive tablet computer 604 and handles 642, 644 with manipulandums disposed thereon for a user to control a game on tablet computer 604. Docking portion 640 connects haptic peripheral 602 to tablet computer 604 such that actions by the user on handles 642, 644, such as pressing buttons, moving joysticks, pressing triggers, etc., result in actions on the game being played on tablet computer 604.

Handles 642, 644 include typical manipulandums or user input elements found on controllers. The manipulandums will be described with respect to handle 644. However, those skilled in the art would recognize that the same or similar manipulandums may be used on handle 642. In particular, handle 644 includes a joystick 622, a button 630, and a trigger 632. As can be seen in FIG. 6 and known to those skilled in the art, more than one of each of these user input elements may be included on each handle 642, 644. Further, handles 642, 644 include general or rumble haptic output devices 626, 628 attached thereto in a location where hands of the user are generally located for providing general or rumble haptic effects to handles 642, 644 as described above with respect to general or rumble haptic output devices 326, 328.

As shown in the block diagram of FIG. 7, haptic peripheral 602 includes a local processor 612 which communicates with tablet computer 604 via docking portion 640. The block diagram of FIG. 7 shows only one (1) of each of joystick 622, button 630, and trigger 632. However, those skilled in the art would understand that multiple joysticks, buttons, and triggers, as well as other user input elements, may be used, as described above. Local processor 612 is coupled to targeted haptic output devices 618A, 618B, 618C as well as position sensors 623, 631, 633 of joystick 622, button 630, and trigger 632, respectively. In response to signals received from position sensors 623, 631, 633, local processor 612 instructs targeted haptic output devices 618A, 618B, 618C to provide directed or targeted effects directly to joystick 622, button 630, and trigger 632, respectively. Local processor 612 of haptic peripheral 602 is coupled to each haptic output device to provide haptic effects thereto based on high level supervisory or streaming commands from host computer 604. The haptic output devices of haptic peripheral 602 may be any type of actuator listed herein for haptic output device 118 of haptic peripheral 102.

Regardless of which haptic peripheral configuration or embodiment is utilized, the host processor and/or the local processor of the system is configured to receive an audio track or file that includes control parameters for a haptic effect to be output via a haptic output device of the haptic peripheral. Stated another way, an audio track or file is utilized as a means to deliver or provide haptic effects to the host processor and/or the local processor of the system. Essentially, control parameters for one or more haptic effects are encoded onto an audio track or file and then provided or transmitted to the host processor and/or the local processor of the system. In an embodiment, the audio track or file may be a WAV file or other file having an audio component that may include one or more independent audio channels. For example, the audio track or file may be a video file such as a MOV file that includes one or more independent audio channels. The audio track or file may have a mono or monophonic audio format, stereo or stereophonic audio format, or a multi-channel audio format. As will be explained in more detail herein with respect to FIG. 12, after control parameters for one or more haptic effects are encoded onto an audio track or file, the audio track or file may be converted into a haptic-specific file or format such as a HAPT file prior to being provided or transmitted to the host processor and/or the local processor of the system. Stated another way, although initially encoded onto an audio track or file, the haptic effects may subsequently be converted into a haptic file (e.g., a file having a haptic-specific format such as a HAPT file) which does not include an audio component without departing from the scope of the invention. Software on the processor decodes the audio track or file, or decodes the haptic file generated from the audio track or file, and directs the haptic output device of the haptic peripheral to output the haptic effect according to the control parameters.

Figure 8:
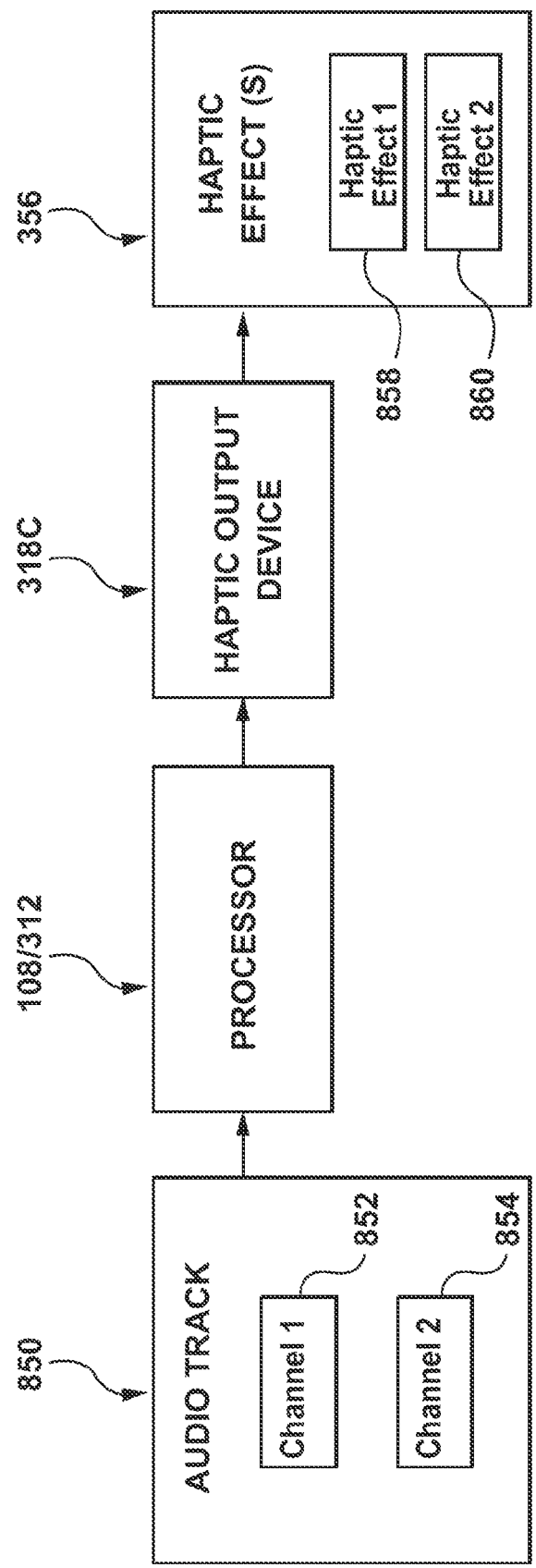
FIG. 8 illustrates a block diagram of a system for providing haptic effects to a haptic peripheral according to an embodiment hereof, wherein an audio file includes a first channel having a first set of control parameters to generate a first haptic effect and a second channel having a second set of control parameters to generate a second haptic effect.

More particularly, use of an audio track or file 850 to provide haptic effects will be described in more detail with respect to FIG. 8. FIG. 8 illustrates a block diagram of a system for providing haptic effects to a haptic peripheral according to an embodiment hereof. For sake of illustration only, use of an audio track or file to provide haptic effects will be described in more detail with respect to haptic peripheral 302 and trigger 332 having targeted haptic output device 318C as described above. However, it will be understood by one of ordinary skill in the art that the use of an audio track or file to provide haptic effects may be similarly applied to haptic peripheral 102, haptic peripheral 602, or a haptic peripheral having another configuration as known in the video gaming art. Further, it will be understood by one of ordinary skill in the art that the use of an audio track or file to provide haptic effects may be similarly applied to the other user input elements of the haptic peripheral, e.g., joystick 322, button 330 having targeted haptic output devices 318A, 318B, respectively, and/or housing 324 having rumble haptic output devices 326, 328. Further, in another embodiment hereof, the use of an audio track or file to provide haptic effects may be similarly applied to the haptic peripheral itself to result or cause movement thereof.

In this embodiment, audio track or file 850 includes a first channel 852 having a first set of control parameters to generate a first haptic effect 858 to be output via haptic output device 318C of haptic peripheral 302 and a second channel 854 having a second set of control parameters to generate a second haptic effect 860 to be output via haptic output device 318C of haptic peripheral 302. Audio track or file 850 is a WAV file or other sound file that that includes two independent audio channels (first channel 852 and second channel 854) generated by an audio mixing process. Audio mixing is a process by which multiple source sound signals are combined into one or more channels. In the process, the source signals' level, frequency content, dynamics, and/or panoramic position may be manipulated. When utilized hereto for providing haptic effects according to embodiments herein, the source signal(s) are manipulated in order to convey particular haptic effects to a haptic output device of the haptic peripheral as will be described in more detail herein.

In the embodiment of FIG. 8, audio track or file 850 has a stereo or stereophonic audio format with two independent audio channels, e.g., first channel 852 and second channel 854. A stereo or stereophonic audio format is achieved by using two independent audio channels (e.g., a left channel and a right channel) that are to be output via two speakers (e.g., a left speaker and a right speaker) in such a way as to create the impression of sound heard from opposing directions as in natural hearing. Although shown with two independent audio channels, audio track or file 850 may have a multi-channel audio format in which the audio track or file includes more than two independent audio channels. Further, audio track or file 850 may have a mono or monophonic audio format with only a single audio channel that is to be output from one position, often centered in the sound field.

In an embodiment hereof, audio track or file 850 is generated via panning of the source signal(s). Stated another way, audio track or file 850 is generated or programmed via a panning tool utilized in the audio mixing process. Panning in the audio mixing process is the distribution of a sound signal (either monophonic or stereophonic pairs) into a new stereo or multi-channel sound field determined by a pan control setting. Exemplary panning tools that may be utilized include panning features available in commercial audio editing suites or programs such as but not limited to Pro Tools, Logic Pro, Audition, Audacity, Sony SoundForge, Ableton Live, or Bitwig Studio as well as panning features available in commercial video editors include such as but not limited to Premiere Pro or Avid.

Figure 9:
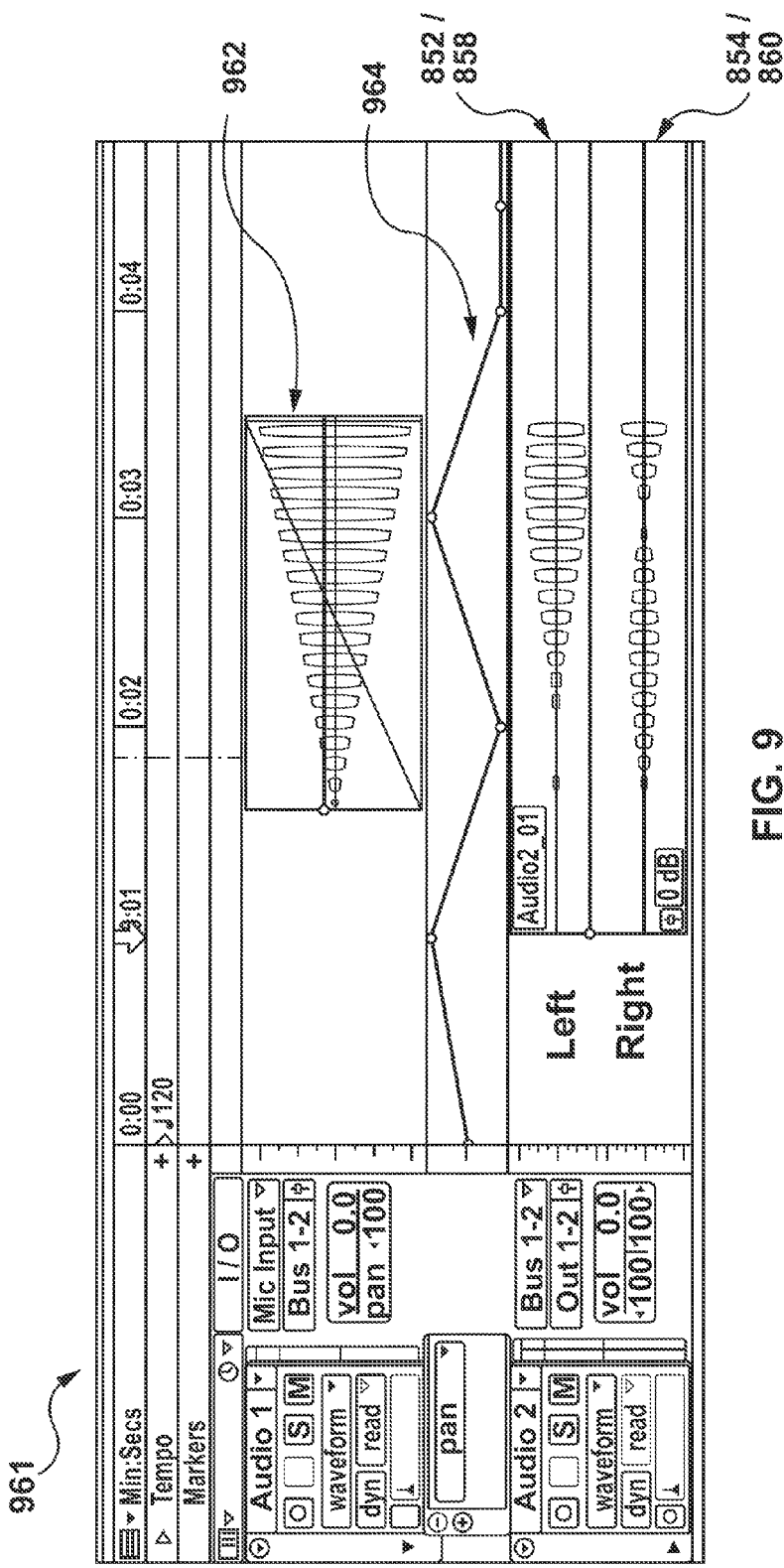
FIG. 9 illustrates an exemplary screen shot of an audio editor program for generating the audio file of FIG. 8.

FIG. 9 illustrates an exemplary screen shot of an audio editor program for generating the audio file of FIG. 8. More particularly, FIG. 9 is a screen shot 961 of audio track or file 850 being generated with via panning of a monophonic source signal 962. Panning feature 964 is utilized to distribute or split monophonic source signal 962 into two channels, i.e, first channel 852 having the first set of control parameters to generate the first haptic effect 858 to be output via haptic output device 318C of haptic peripheral 302 and second channel 854 having the second set of control parameters to generate the second haptic effect 860 to be output via haptic output device 318C of haptic peripheral 302. In addition to panning, the level, frequency content, dynamics, and/or panoramic position of the signals on each channel may also be manipulated via the audio editor program. For example, a pencil tool of an audio editor program may be used to edit the two channels. The pencil tool may be used for volume automation, panning automation, and waveform manipulation. Automation makes mixing a lot more precise and saves a great deal of time, while redrawing or manipulating waveforms permits the programmer to create unusual effects and correct flaws in the track.

Although channels 852, 854 are described herein as being generated via a panning tool, a panning tool is not the only implementation to distribute or divide a source sound signal. In another embodiment hereof, channels 852, 854 is comprised of multiple monophonic tracks that are mixed down into an interleaved WAV file.

Figure 10A:
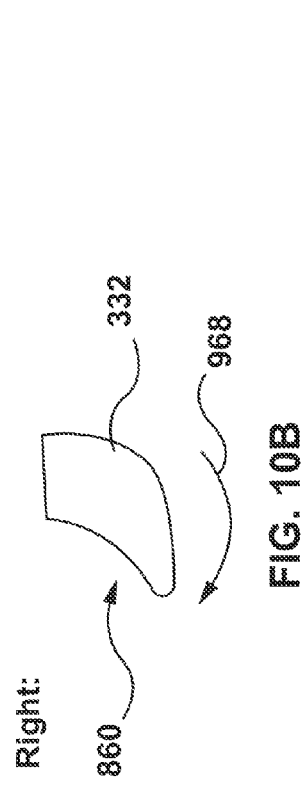
FIG. 10A is a side view of a trigger of the haptic peripheral of FIG. 3, wherein the trigger is removed from the haptic peripheral for sake of illustration only and the trigger is shown outputting the first haptic effect of FIG. 8.
Figure 10B:
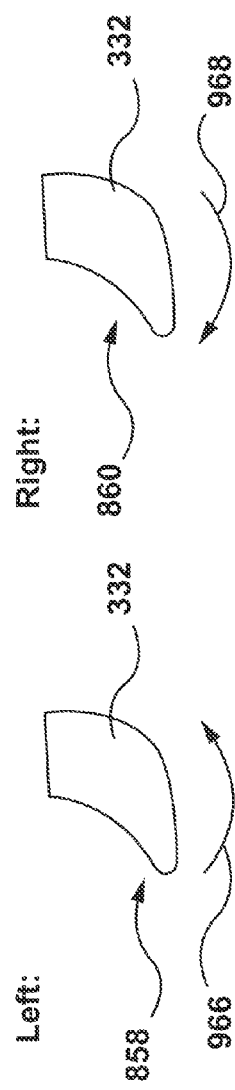
FIG. 10B is a side view of a trigger of the haptic peripheral of FIG. 3, wherein the trigger is removed from the haptic peripheral for sake of illustration only and the trigger is shown outputting the second haptic effect of FIG. 8.

In an embodiment, first and second haptic effects 858, 860 are configured to move trigger 332 of haptic peripheral 302 in opposing directions. More particularly, with reference to the side views of trigger 332 shown in FIGS. 10A and 10B, trigger 332 is bi-directional trigger which may be moved inward and outward via targeted haptic output device 318C. FIGS. 10A and 10B are side views of trigger 332 of haptic peripheral 302, the trigger being removed from the haptic peripheral for sake of illustration only, with FIG. 10A illustrating trigger 332 outputting first haptic effect 858 and FIG. 10B illustrating trigger 332 outputting second haptic effect 860. The first set of control parameters from first channel 852 (see FIG. 8) moves trigger 332 in a first or inward direction as indicated via directional arrow 966 and the second set of control parameters from second channel 854 (see FIG. 8) moves trigger 332 in a second or outward direction as indicated via directional arrow 968. Stated another way, when applied to trigger 332, second haptic effect 860 from second channel 854 of audio track or file 850 pushes or moves the trigger outwards which causes resistance while first haptic effect 858 from first channel 852 of audio track or file 850 pulls or moves the trigger inwards which causes a loss of resistance. Pushing or moving the trigger outwards causes resistance since a person's finger can only move the trigger inwards, while pulling or moving the trigger inwards causes a loss of resistance which is useful to convey a detent. Each set of control parameters or haptic effect will result in a different feeling to the user. For example, first haptic effect 858 works well to accentuate motions of pulling inward or downward for creating a feeling of loss of resistance, whereas second haptic effect 860 works well for motions of pushing forward or upward for creating a feeling of resistance. Use of push or pull effects depend heavily on context, animation, and strength of the haptic output device(s). A strong haptic output device may mimic pushing animations with pushing effects throughout the entire animation as a sort of implied realism, whereas a relatively weaker haptic output device will instead use a short pull in an effort to trick the user's brain at the extreme ends of the pushing animation. In another example, changing between pushing trigger 332 outwards and pulling trigger 332 inwards every 30 milliseconds may be utilized to create or simulate a shooting effect.

In another embodiment, first and second haptic effects 858, 860 are different timelines of haptic effects to be output to trigger 332 at different times and/or according to different sensed conditions or states. The first set of control parameters from first channel 852 (see FIG. 8) is a first timeline or sequence of haptic effects to be applied to trigger 332 and the second set of control parameters from second channel 854 (see FIG. 8) is a second timeline or sequence of haptic effects to be applied to trigger 332. For example, in an embodiment, the first timeline or sequence of haptic effects to be applied to trigger 332 may include vibration of trigger 332 while the second timeline or sequence of haptic effects to be applied to trigger 332 may include detents of trigger 332. In order to convey or dictate a vibrational effect to trigger 332, the source signal(s) of channel 852 may be manipulated to include a periodic signal having a predetermined period such as 10 milliseconds. When applied to trigger 332 of haptic peripheral 302 via targeted haptic output device 318C, a 10 millisecond periodic (10 millisecond on, 10 millisecond gap, repeated) results in vibration of the trigger. In order to convey or dictate a detent effect to trigger 332, the source signal(s) of channel 854 may be manipulated to include a temporary effect in which trigger 332 is pulled or moved inward and/or downward for creating or causing a loss of resistance as described above with respect to FIG. 10A. Detents are created using short, strong pulses of signal. If another texture or effect is being played simultaneously, the signal will need to be rendered in the reverse direction of the primary effect being played. Alternatively, other effects can be muted (in their entirety or at least 30 milliseconds on either side of the detent effect) and short pulses of push signal may be sent (usually ranging 5-30 ms). The haptic effects that are output by haptic output device 318C can include but are not limited to varying degrees of vibrations, varying degrees of detents, or other types of haptic effects. Thus, when generating or programming audio track or file 850, the versatility of commercial audio editing programs can be used to generate haptic effects with multiple timelines. The control parameters are mapped to the first and second channels 852, 854 via panning or other tools within the audio editing program, and the control parameters of each channel dictate the type, amount, and frequency of haptic effects to be applied to trigger 332.

Once audio track or file 850 is generated or programmed as desired, audio track or file 850 is sent or otherwise transmitted to host processor 108 of host computer 104 and/or local processor 312 of haptic peripheral 302. The generated or programmed audio track or file 850 is saved onto any type of storage device or computer-readable medium. An application such as a gaming application causes the audio track or file 850 to be loaded from the storage device or computer-readable medium and transmitted to the haptic peripheral. Further, as described with respect to FIG. 12, a haptic preview tool may be utilized for visualizing and/or modifying the haptic effects from the audio track or file 850 prior to transmission to host processor 108 of host computer 104 and/or local processor 312 of haptic peripheral 302. Host processor 308 of host computer 304 and/or local processor 312 of haptic peripheral 302 is configured to receive audio track or file 850 (or receive a haptic-specific file converted from audio track or file 850 as described with respect to FIG. 12), and includes software that is configured to decode the first and second sets of control parameters from audio track or file 850 (or control parameters from the haptic-specific file converted from audio track or file 850 as described with respect to FIG. 12). Haptic effects for targeted haptic output device 318C of trigger 332 may then be considered to be programmed onto host processor 308 of host computer 304 and/or local processor 312 of haptic peripheral 302. These haptic effects may form a pre-defined mapping of change of state and haptic effects. For example, the pre-defined mapping system may dictate that a particular timeline or sequence of the programmed haptic effects be played depending upon the detected state. If it is determined that a detected state has an associated haptic effect, then host processor 108 and/or local processor 312 outputs an associated control signal that includes the first and/or second sets of control parameters for the associated haptic effect.

Host processor 308 of host computer 304 and/or local processor 312 of haptic peripheral 302 is configured to output a control or drive signal to targeted haptic output device 318C that includes the control parameters for the haptic effect. For example, when in operation, voltage magnitudes and durations are streamed from the host or local processor where information is provided to targeted haptic output device 318C. The control or drive signal instructs targeted haptic output device 318C as to particular characteristics of the haptic effect which is to be output (e.g. magnitude, frequency, duration, etc.). Targeted haptic output device 318C of trigger 332 is configured to receive the control signal from host processor 108 and/or local processor 312 and to output the haptic effect to the haptic peripheral. As an illustrative example, if a user is controlling a character or some other graphical object and then encounters an explosion in the virtual environment, the associated haptic effect might be a vibration. In this case, host processor 108 and/or local processor 312 sends a control signal to targeted haptic output device 318C to provide the appropriate haptic effect, which in this example is a vibration with a particular strength.

The use of audio file 850 to provide or program haptic effects for trigger 332 protects the tool chain and workflow for providing haptic effects to the haptic peripheral. More particularly, rather than time-intensive custom authoring of haptic effects for each haptic output device, the use of audio file 850 simplifies both the creation of haptic effects for trigger 332 as well as the process of creating a plugin tool or app for the audio editor program because the audio editor program where the audio file is generated provides visualization of the haptic effects. In addition, the use of audio file 850 allows the flexibility of multiple timelines to quickly generate complex or diverse haptic effects.

FIG. 11 illustrates a block diagram of a system for providing haptic effects to multiple haptic output devices of haptic peripheral 302. Haptic effects can be composed from separate audio files for each haptic output device to provide spatial haptic effects in which different haptic effects are output via separate or distinct haptic output devices. For sake of illustration only, use of audio tracks or files to provide haptic effects will be described in more detail with respect to haptic peripheral 302 and joystick 322, button 330, trigger 332 having targeted haptic output devices 318A, 318B, 318C as described above. However, it will be understood by one of ordinary skill in the art that the use of audio tracks or files to provide haptic effects may be similarly applied to haptic peripheral 102, haptic peripheral 602, or a haptic peripheral having another configuration as known in the video gaming art.

More particularly, a plurality of audio files $1150_1$, $1150_2$, $1150_3$, $1150_4$ include at least one channel (not shown in FIG. 11) having a set of control parameters to generate a respective haptic effect $1156_1$, $1156_2$, $1156_3$, $1156_4$ via each respective haptic output device 318A, 318B, 318C, 326/328. Stated another way, audio file $1150_1$ includes at least one channel having a set of control parameters to generate a haptic effect $1156_1$ to be output to joystick 322 via targeted haptic output device 318A of haptic peripheral 302. Similarly, audio file $1150_2$ includes at least one channel having a set of control parameters to generate a haptic effect $1156_2$ to be output to button 330 via targeted haptic output device 318B of haptic peripheral 302. Similarly, audio file $1150_3$ includes at least one channel having a set of control parameters to generate a haptic effect $1156_3$ to be output to trigger 332 via targeted haptic output device 318C of haptic peripheral 302. Similarly, audio file $1150_4$ includes at least one channel having a set of control parameters to generate a haptic effect $1156_4$ to be output to housing 324 via one of rumble haptic output devices 326, 328 of haptic peripheral 302. As described above with respect to audio file 850, each audio file $1150_1$, $1150_2$, $1150_3$, $1150_4$ may include more than one channel. For example, each audio file $1150_1$, $1150_2$, $1150_3$, $1150_4$ may include two independent audio channels generated by an audio mixing process.

In an embodiment hereof, two or more of audio files $1150_1$, $1150_2$, $1150_3$, $1150_4$ may be generated via panning of the source signal(s). Stated another way, two or more of audio files $1150_1$, $1150_2$, $1150_3$, $1150_4$ are generated or programmed via a panning tool utilized in the audio mixing process. For example, the panning tool may be applied to quickly create multi-channel audio formats to scale for devices that have multiple haptic output devices. A monophonic source signal may be quickly split or distributed into two or more tracks, each track including a set of control parameters to generate a haptic effect to be output via one of the haptic output devices. In addition or as an alternative, two or more of audio files $1150_1$, $1150_2$, $1150_3$, $1150_4$ are generated or programmed via a pencil tool utilized in the audio mixing process. The pencil tool would be used to generate quick shapes with regard to panning, waveform, frequency, volume/strength, and the like. The pencil tool may also be used to generate regular textures that occur at the same period and strength, or randomized textures that occur at the same period but with randomized strength or volume.

Figure 12:
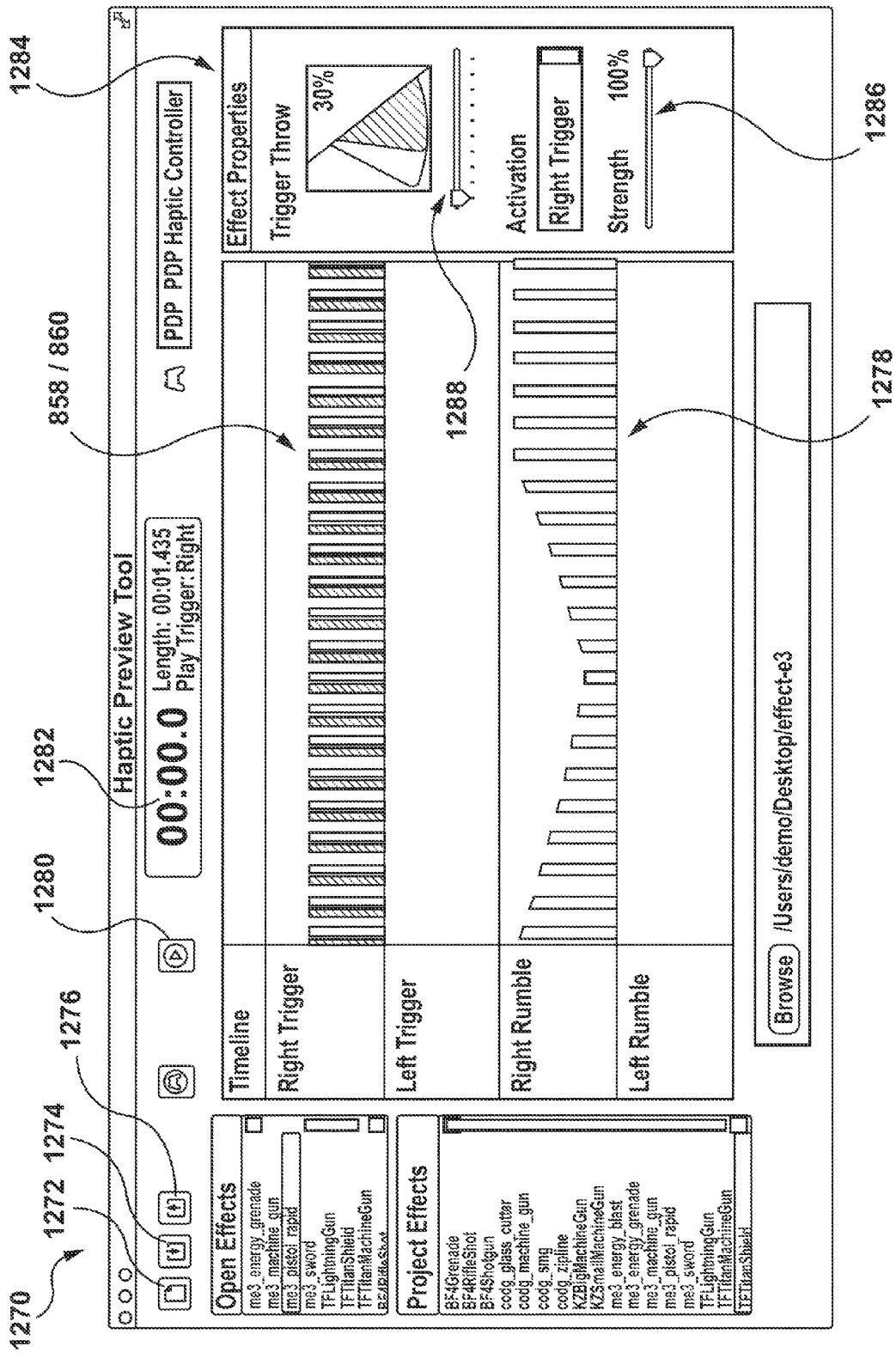
FIG. 12 illustrates an exemplary screen shot of a haptic preview tool for a haptic peripheral having programmed control parameters to generate a haptic effect for each haptic output device, wherein the control parameters were generated via an audio file for each respective haptic output device.

In an embodiment hereof, host processor 308 of host computer 304 and/or local processor 312 of haptic peripheral 302 is configured to directly receive an audio file (e.g., audio file 850 or audio files $1150_1$, $1150_2$, $1150_3$, $1150_4$) and is configured to decode the control parameters of the audio file. In another embodiment hereof, a haptic preview tool may be utilized for haptic effect visualization and/or modification prior to the haptic effects being transmitted to host processor 308 of host computer 304 and/or local processor 312 of haptic peripheral 302. For example, FIG. 12 illustrates an exemplary screen shot 1270 of a haptic preview tool for previewing and/or modifying the control parameters for haptic effects from an audio file (e.g., audio file 850 or audio files $1150_1$, $1150_2$, $1150_3$, $1150_4$). Stated another way, the control parameters for haptic effects were generated via an audio file for each respective haptic output device. Screen shot 1270 includes a new button 1272, an import button 1274, and an export button 1276. New button 1272 opens an empty effect template and lets the user create new effects from one or more audio files by placing them on different tracks and combining them. Import Button 1274 opens a window that will allow the user to import one or more audio files for each of the available haptic output devices (e.g., in this embodiment the available haptic output devices include a left trigger, a right trigger, a right rumble, and a left rumble). The user will be able to specify the output directory as well as the name. Export Button 1276 converts the control parameters from the one or more audio files (e.g., audio file 850 or audio files $1150_1$, $1150_2$, $1150_3$, $1150_4$) into a predetermined haptic file format for playback on the haptic peripheral. Thus, once export button 1276 is utilized, the haptic effects are no longer encoded into an audio file or format (e.g., WAV files) but rather the haptic effects are converted to a haptic-specific file or format such as HAPT files that do not include an audio component.

The haptic preview tool which generates screen shot 1270 allows haptic effect visualization so that the users feel and modify a library of haptic effects before the final effects are integrated into the video game via transmission to host processor 308 of host computer 304 and/or local processor 312 of haptic peripheral 302. More particularly, when the haptic preview tool is opened, the haptic preview tool displays a separate track for each of the haptic output devices. Each track is a visual representation of the programmed haptic effects or control parameters previously generated by or encoded in the audio file(s). The visualization lets users understand intuitively how the programmed haptic effects are composed and how they play across the different haptic output devices. For example, FIG. 12 illustrates first and second programmed haptic effects 858, 860 for a right trigger 332 via targeted haptic output device 318C and programmed haptic effects 1278 for housing 324 via a right rumble haptic output device 326. First and second programmed haptic effects 858, 860 (i.e, the "push" and "pull" effects described above with respect to FIGS. 10A and 10B) are displayed in different colors.

When the track is played via a play or start button 1280, a progress bar 1282 plays or fills and tracks themselves also fill with color. The individual tracks or haptic output devices can be muted via the "M" button in each track. This is very useful because it allows selective playback of only certain haptic output devices. For example, it may be difficult to consciously discern subtle trigger effects when rumble effects are playing. Muting the rumble tracks let user experience only the trigger effects.

The haptic preview tool which generates screen shot 1270 may further be used to customize or adjust the strength or volume of an overall effect via an effect properties menu 1284. The strength or volume of a haptic effect may be modified graphically via strength slider 1286, which modifies the haptic-specific file (e.g., the HAPT file) but not the source audio file (e.g., WAV file) from which the haptic-specific file was generated. Modifying the strength settings via strength slider 1286 will change the visual representation displayed on screen shot 1270 as well. Effect properties menu 1284 also includes a trigger throw slider 1288. The trigger or activation point of a trigger 332, which is the point of depression or degree or travel at which the haptic effect starts playing, may be graphically modified or set via trigger throw slider 1288.

Figure 13:
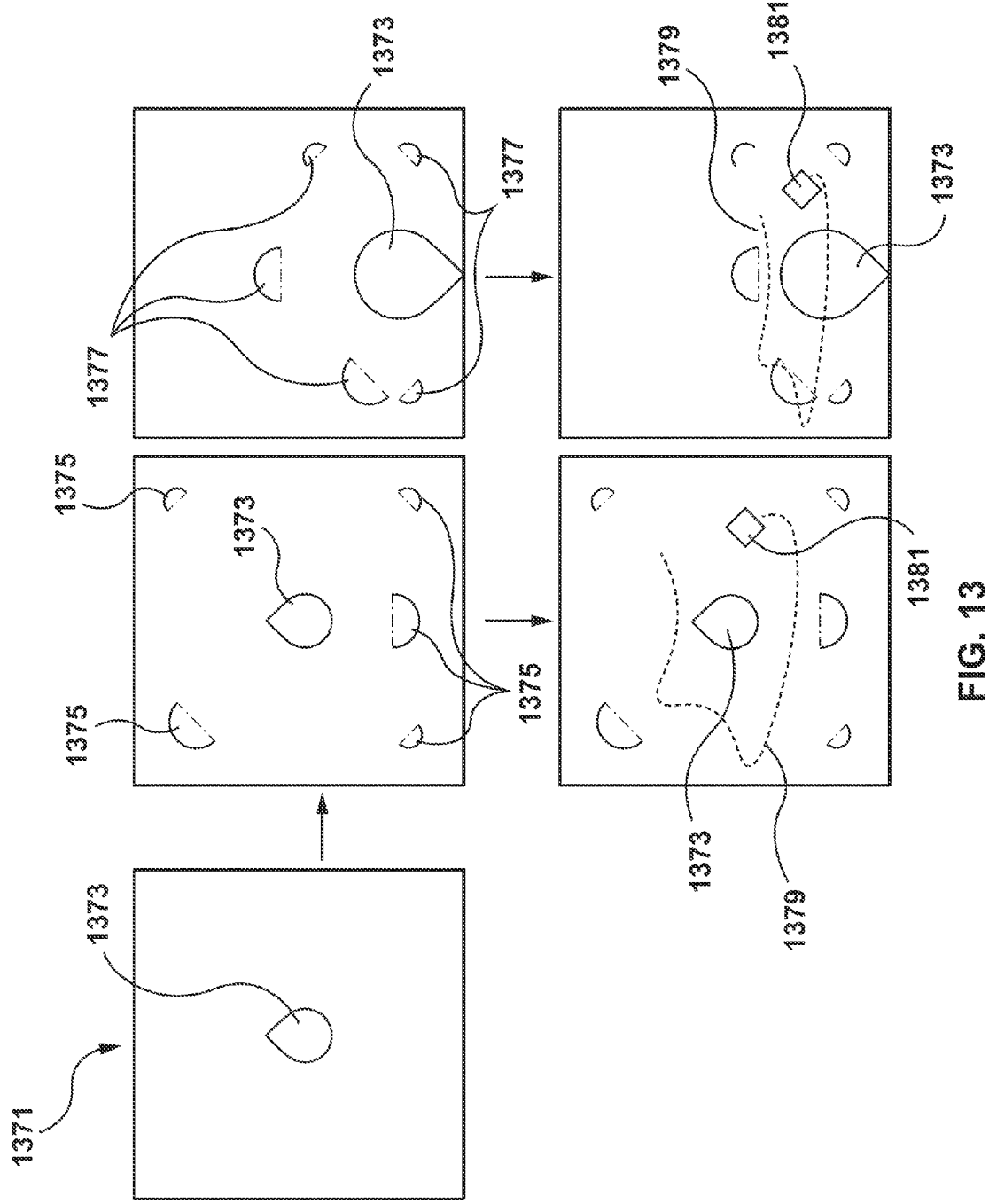
FIG. 13 illustrates a custom panning environment for generating an audio file with a set of control parameters for a haptic effect.

As described above, an audio track or file for providing haptic effects may be generated using commercial audio editing suites or programs such as but not limited to Pro Tools, Logic Pro, Audition, Audacity, Sony SoundForge, Ableton Live, or Bitwig Studio as well as panning features available in commercial video editors include such as but not limited to Premiere Pro or Avid. However, in another embodiment hereof, a custom audio editing program may be developed for providing haptic effects. For example, FIG. 13 illustrates a custom panning environment for generating an audio file with a set of control parameters for a haptic effect. In FIG. 13, a workspace 1371 includes a simulated location base or point of reception 1373. One-dimensional emitters or channels 1375 and/or multi-dimensional emitters or channels 1377 are configured around simulated point of reception 1373, and then a pan effect 1379 is generated by drawing a motion path of a haptic effect 1381 as desired. Pan effect 1379 distributes haptic effect 1381 among the channels 1375, 1377 as drawn by the user. Thus, as shown in FIG. 13, haptic effect 1381 is distributed into multi-channels via pan effect 1379.

Figure 14:
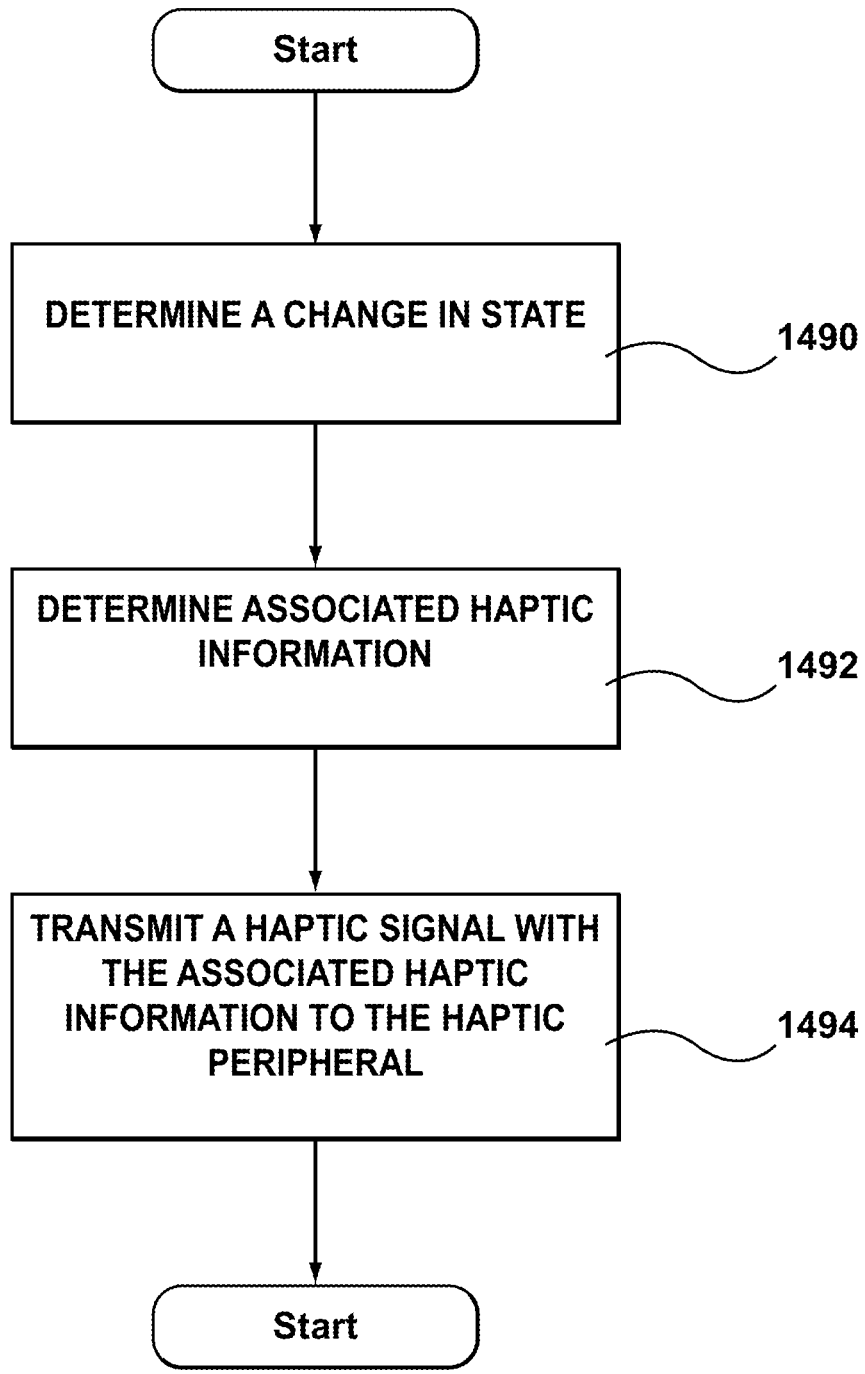
FIG. 14 is a flow chart illustrating a method for determining and transmitting a haptic signal from a host computer according to an embodiment hereof, wherein the rendered haptic effects are programmed or generated via use of one or more audio files as described herein.

FIG. 14 is a flow chart illustrating a method for determining and transmitting a haptic signal from a host computer according to an embodiment hereof, wherein the rendered haptic effects are programmed or generated via use of one or more audio files as described herein. In an embodiment, the functionality of the flow diagram of FIG. 14 is implemented by software stored in the memory of the host component and executed by the host processor, and/or the memory of the haptic peripheral and executed by the local processor. In other embodiments, the functionality may be performed by hardware through the use of an application specific integrated circuit ("ASIC"), a programmable gate array ("PGA"), a field programmable gate array ("FPGA"), or any combination of hardware and software.

At step 1490, the host or local processor determines whether there is a change in state. In one embodiment, this change can be a change in a virtual space for a game or a simulation. As an example, a user could be moving a character or some other graphical object and then encounters an explosion in the virtual environment. The character movement and/or encountering the explosion (or other virtual object that is a source or cause of a haptic effect) may be a change in state. In another embodiment, this change can be a sensed position or state by one of position sensors 323, 331, 333. As described above, joystick 322 includes a position sensor 323 coupled thereto, button 330 includes a position sensor 331 coupled thereto, and trigger 332 includes a position sensor 333 coupled thereto. One of ordinary skill in the art would understand that changes in state are not limited to the example stated above.

At step 1492, the host or local processor then determines the associated haptic effect with the change in state. For example, in the scenario of a user controlling a virtual character and that character encountering with a virtual object such as an explosion, such an encounter could have an associated haptic effect, such as a vibration. The process of determining whether there is an associated haptic effect with the change of state can be done in a multiple ways. If it is determined that the change of state has an associated haptic effect, then a haptic signal will be sent. If it is determined that the change of state does not have an associated haptic effect, then no haptic signal will be sent. In one embodiment, host computer 104 accesses a pre-defined mapping of change of state and haptic effects formed from one or more audio file(s). For example, the pre-defined mapping system may dictate that a particular timeline or sequence of the programmed haptic effects be played depending upon the detected state. If it is determined that a detected state has an associated haptic effect, then the host or local processor outputs an associated control signal that includes control parameters for the associated haptic effect.

At step 1494, the host or local processor transmits the haptic information to the appropriate targeted haptic output device using a control signal with the associated haptic information. The transmission of the haptic information can be done either through wired or wireless communication, as previously described. The targeted haptic output device is configured to receive the control signal from the host or local processor and to output the haptic effect to respective user input element (e.g., the joystick, button, trigger) or the housing of the haptic peripheral.

While various embodiments according to the present invention have been described above, it should be understood that they have been presented by way of illustration and example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. A system comprising:
a processor configured to receive a file including a first channel having a first set of control parameters to generate a first timeline of haptic effects and a second channel having a second set of control parameters to generate a second timeline of haptic effects and to output a control signal that includes the first set of control parameters for the first timeline of haptic effects and the second set of control parameters for the second timeline of haptic effects, wherein the file is an audio file or a haptic file generated from the audio file; and
a haptic peripheral including a haptic output device, the haptic output device being coupled to a user input element of the haptic peripheral, wherein the haptic output device is configured to receive the control signal from the processor and to output the first and second timelines of haptic effects to the user input element of the haptic peripheral.

2. The system of claim 1, wherein the processor includes software that is configured to decode the first and second sets of control parameters of the file.

3. The system of claim 2, wherein the audio file is a WAV file.

4. The system of claim 1, wherein the audio file is generated via panning of a sound signal.

5. The system of claim 4, wherein the sound signal is a monophonic audio signal or a stereophonic audio signal.

6. The system of claim 1, wherein the audio file is an interleaved file that is generated by mixing down a plurality of monophonic tracks.

7. The system of claim 1, wherein the user input element is a bi-directional trigger of the haptic peripheral and the first timeline of haptic effects moves the bi-directional trigger in a first direction and the second timeline of haptic effects moves the bi-directional trigger in a second opposing direction.

8. The system of claim 1, wherein the haptic peripheral includes a plurality of haptic output devices and the processor is configured to receive a plurality of files, each file including control parameters for a haptic effect for one of the plurality of haptic output devices and each file being an audio file or a haptic file generated from the audio file.

9. The system of claim 1, wherein the first timeline includes vibration of the user input element and the second timeline includes detents of the user input element.

10. The system of claim 1, wherein the user input element is one of a bi-directional trigger, a joystick, or a button.

11. The system of claim 1, wherein the processor is disposed in a host computer.

12. The system of claim 1, wherein the processor is disposed in the haptic peripheral.

13. A system comprising:
   a processor configured to receive a file that includes a first channel having a first set of control parameters to generate a first haptic effect and a second channel having a second set of control parameters to generate a second haptic effect and to output a control signal that includes the first set of control parameters for the first haptic effect and the second set of control parameters for the second haptic effect, wherein the file is an audio file or a haptic file generated from the audio file; and
   a haptic peripheral including a haptic output device, wherein the haptic output device is configured to receive the control signal from the processor and to output the first and second haptic effects to the haptic peripheral.

14. The system of claim 13, wherein the audio file is generated via panning of a sound signal.

15. The system of claim 13, wherein the haptic output device is coupled to a bi-directional trigger of the haptic peripheral and the first set of control parameters moves the bi-directional trigger in a first direction and the second set of control parameters moves the bi-directional trigger in a second opposing direction.

16. The system of claim 13, wherein the haptic output device is coupled to a user input element of the haptic peripheral and the first set of control parameters generates a first timeline of haptic effects to the user input element and the second set of control parameters generates a second timeline of haptic effects to the user input element.

17. A method of providing haptic effects to a haptic peripheral, wherein the method comprises the steps of:
   generating an audio file that includes a first channel having a first set of control parameters to generate a first haptic effect and a second channel having a second set of control parameters to generate a second haptic effect;
   sending the audio file to a processor, wherein the processor is configured to receive the audio file and to output a control signal that includes the first set of control parameters for the first haptic effect and the second set of control parameters for the second haptic effect, the control signal being configured to be received by a haptic output device of the haptic peripheral that is configured to output the first and second haptic effects to the haptic peripheral.

18. The method of claim 17, wherein the step of generating an audio file includes panning an audio signal.

19. The method of claim 17, wherein the step of generating an audio file includes mixing down a plurality of monophonic tracks.

20. The system of claim 1, wherein the first and second timelines of haptic effects are to be output to the user input element at different times or according to different sensed conditions.

\* \* \* \* \*